June 8, 1954

F. H. S. ROSSIRE 2,680,580

ALTITUDE CONTROL SWITCH

Filed Aug. 1, 1950

INVENTOR.
FRANCIS HENRY S. ROSSIRE
BY

*ATTORNEY*

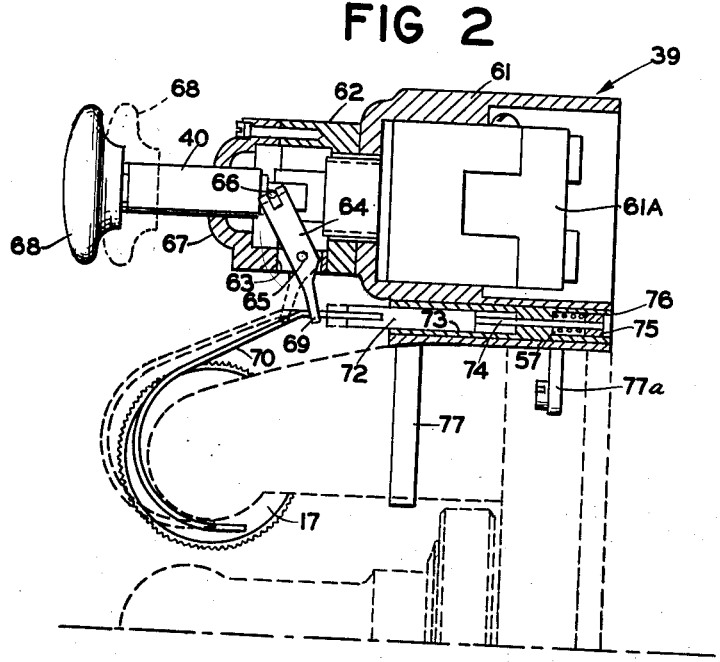

Patented June 8, 1954

2,680,580

UNITED STATES PATENT OFFICE 2,680,580

ALTITUDE CONTROL SWITCH

Francis Henry S. Rossire, Leonia, N. J., assignor to Bendix Aviation Corporation, Teterboro, N. J., a corporation of Delaware Application August 1, 1950, Serial No. 177,080

12 Claims. (Cl. 244—77)

This invention relates to altitude control units for automatic pilot systems and more particularly to a safety switch for preventing trimming of the craft elevator surface while the altitude control unit is connected into the automatic pilot system and as such constitutes an improvement over the altitude control unit shown in U. S. Patent No. 2,512,902, issued June 27, 1950.

Generally, level craft flight attitude is automatically maintained by controlling craft elevator surface from a pitch take-off located at a gyro horizon which only responds to a nose-up or nose-down condition to bring the aircraft to the desired level attitude. Even though the gyro horizon and its pitch take-off are effective to control level craft flight, they are not able to maintain the craft at a desired altitude. A change in craft elevation may take place due to up or down drafts without a change in the relation between the longitudinal axis of the craft and the plane of level flight so that a relation of equilibrium will be maintained between the gyro and its take off whereby no counteracting control is provided to the elevator.

In order to overcome this disadvantage so as to maintain the craft at the desired altitude level, the novel arrangement of aforementioned Patent No. 2,512,902 has been provided wherein a pressure responsive means, normally open to atmosphere on one side and adapted for drivable connection with a signal generating device through an electromagnetic clutch, drives the signal generating device in response to altitude changes occurring subsequent to clutch energization. A centering device is provided which is automatically disengaged during the operation of the altitude control unit to eliminate unnecessary loading of the pressure responsive means thereby improving its sensitivity and the all around reliability of the unit.

The present invention contemplates an improvement over the arrangement of the aforementioned Patent No. 2,512,902 in embodying an altitude control switch for connecting the altitude control unit into the automatic pilot system and simultaneously preventing operation or access to a manually operable pitch trim control wheel while the altitude control unit is so engaged. Means are also provided for disengaging the altitude control unit from the automatic pilot system upon failure of power to the pilot system, or upon the servo clutches, which drive the aircraft's control surfaces, being disengaged, and also whenever the pilot system is subjected to radio glide path control. Thus, upon any of the mentioned conditions occurring, the altitude control unit is automatically disengaged from the pilot system to return the aircraft to manual controls, or place it on flight path control alone or to permit actuation of the pitch wheel.

The novel and improved switch which is used in combination with the arrangement shown in the Patent No. 2,512,902 comprises a hand-operated plunger which is movable to an "on" (operative) position and an "off" (inoperative) position to connect the altitude control unit into the automatic pilot system and to disconnect it therefrom. A holding coil circumferentially surrounds the plunger and upon energization thereof, serves to retain the plunger in an operative position. Pivotally connected to the plunger is an arcuate shaped member or guard which is swung over to cover up a manually operable pitch trim wheel when the plunger is shifted to an "on" position. The guard is brought from an operative position to an inoperative position with relation to the pitch trim wheel by shifting the plunger to an "off" position, or by applying a force to the guard, and also by de-energizing the holding coil which permits a resilient means to operate whereby the guard is swung to an inoperative position.

An object of the present invention, therefore, is to provide a novel and improved switch for connecting an altitude controller into an aircraft automatic pilot system.

Another object of the present invention is to provide an automatic pilot system for aircraft employing an altitude controller and a novel switch for preventing operation of a manually operable pitch trim wheel while the altitude controller is in operation.

A further object is to provide an automatic pilot system for aircraft employing an altitude controller and a novel switch wherein means are provided for automatically disconnecting the altitude controller from the automatic pilot system.

Another object is to provide a novel switch for connecting an altitude controller into an automatic pilot system for aircraft and means in the switch operable on failure of power to the pilot system to disconnect the altitude controller from the pilot system.

Still another object of the present invention is to provide a novel switch for connecting an altitude controller into an automatic pilot system for aircraft and means in the switch whereby the pilot may manually disengage the altitude controller from the automatic pilot system.

A still further object is to provide a novel protection unit, which upon being held in one position, prevents access to a control object but, which when moved to another position, permits access to the object.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings, wherein like reference numerals refer to like parts,

Figure 2 is a side elevation sectional view of the novel switch of the present invention; and Figure 3 is a front elevational view of the switch constituting the present invention, and showing in particular the manner of mounting the switch to an automatic pilot controller unit.

Figure 1:
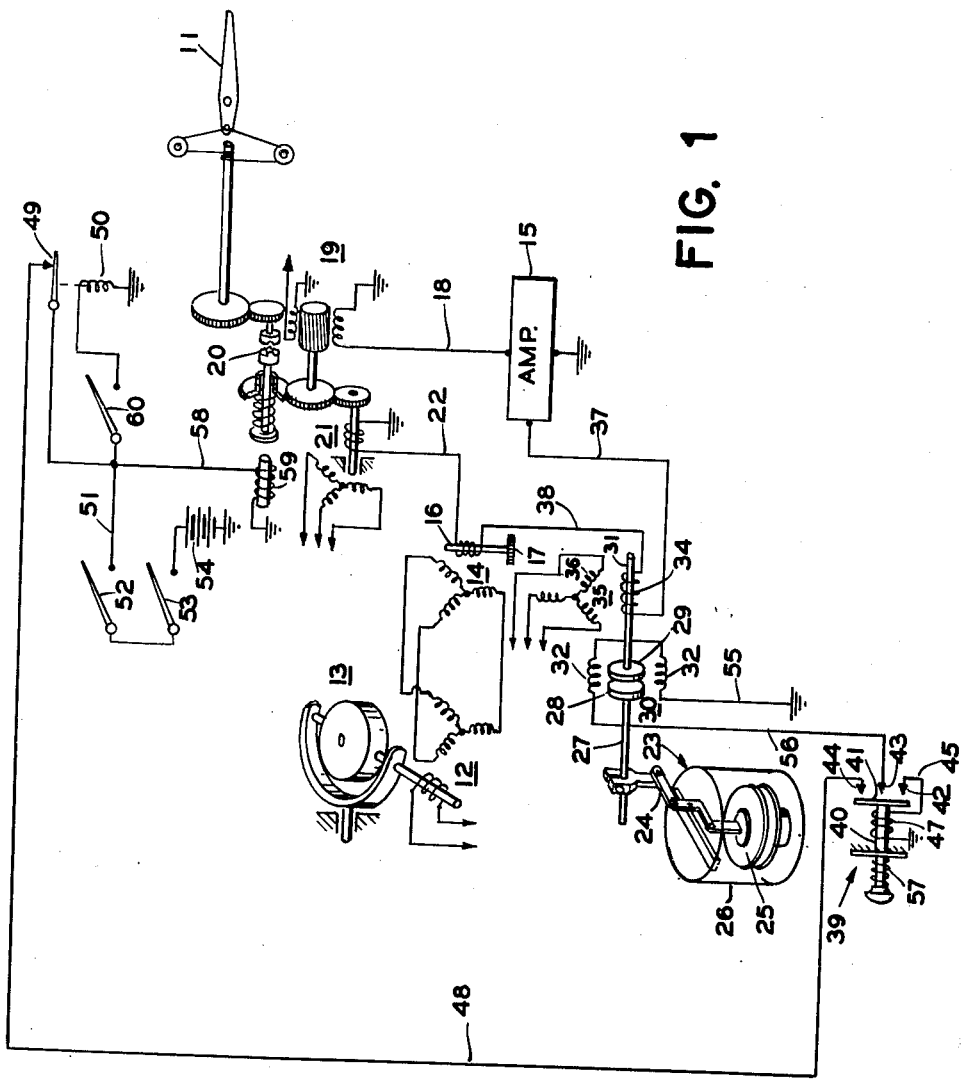
Figure 1 is a diagrammatic illustration of the elevator control portion of an automatic steering system embodying a barometric altitude controller and the novel altitude control switch of the present invention.

The automatic steering arrangement hereof may be generally similar to that fully described and claimed in copending application Serial No. 516,488, filed December 31, 1943, now Patent No. 2,625,348, January 13, 1953, and for a better understanding of the present invention the pitch channel thereof together with the barometric altitude control, more fully shown and described in U. S. Patent No. 2,512,902, issued June 27, 1950, have been here illustrated. As more fully described in the latter patent, the control of elevator 11, as shown in Figure 1, is derived from an inductive pitch take-off 12, arranged about the pitch axis of an artificial horizon gyro 13, which develops a signal that is communicated through an adjustable or manually settable inductive pitch trim device 14 to the input of the pitch channel of a servo amplifier 15. The rotor winding of device 14 is carried on a shaft 16 which is displaceable angularly by a manually operable pitch trim wheel 17 (Figures 1 and 3) of the type shown and described in copending application Serial No. 665,918, filed April 29, 1946, now Patent No. 2,618,446, November 18, 1952. In effect, both gyro 13 and pitch trim wheel 17 provide signals to control elevator 11 together or each acting alone. The output of the pitch channel of servo amplifier 15 is communicated by means of lead 18 to energize a servo motor 19 which operates, through a solenoid actuated clutch 20, the elevator surface 11. The operation of motor 19 also displaces an inductive follow-up device 21 to develop a follow-up signal therein which is algebraically added to the pitch signal of take-off 12 by means of lead 22 to modify the operation of motor 19.

A barometric altitude controller 23 which may be of the type fully described in U. S. Patent No. 2,512,902, issued June 27, 1950, consists of a linkage 24 actuated by an aneroid 25 disposed in a container 26. Motion is transmitted from linkage 24 to a shaft 27 which has connected to it at one end a clutch face 28 drivably associated with a driven clutch face 29 of an electromagnetic clutch 30. The driven clutch element 29 is attached to one end of a shaft 31 which is coaxially mounted with shaft 27. Clutch faces 28 and 29 are surrounded adjacent to their outer periphery by a pair of coils 32 which are adapted for energization in a manner to be described presently. Energization of coils 32 urges clutch face 28 outwardly relative to its shaft 27 into engagement with clutch face 29 whereby the motion of aneroid 25 is communicated to shaft 31.

For angular motion therewith, shaft 31 carries thereon a rotor winding 34 of inductive signal generating device 35 for displacement with respect to its associated stator winding 36, energized from a suitable source of alternating current potential which may be a single phase supply. One end of rotor winding 34 connects by means of a lead 37 to the input of the pitch channel of servo amplifier 15, while the other end receives by means of a lead 38 the pitch signal of the rotor windings of take-off 12 and device 14 as well as the follow-up signal from follow-up device 21. Signal generating device 35 develops within rotor winding 34 a control signal whose magnitude is directly proportional to the relative angular displacement of rotor winding 34 with respect to its stator winding 36. Normally, rotor winding 34 is maintained at its null position relative to stator winding 36 by centralizing means shown in the above referred to patent, but any motion of rotor winding 34 as a result of the contraction or expansion of aneroid 25 develops a control signal within rotor winding 34 proportional to the amount of motion of the aneroid 25.

In operation, if it is desired to change craft altitude, the pitch controller trim wheel 17 is actuated. At this time clutch windings 32 are de-energized so that rotor winding 34 is at a null in spite of aneroid motion. Upon the desired craft altitude being reached and the aircraft leveled off, the barometric altitude controller 23 is engaged by closing an altitude control switch generally designated by the numeral 39 and forming a part of the instant invention. Switch 39 is a multiple contact switch which closes the circuit between a battery 54 and the electromagnetic clutch 30 to energize coils 32 and thereby provide a driving connection between aneroid 25 and rotor winding 34. Thereafter, a change in craft elevation without a change in the relation of the fore and aft axis thereof, produces a pressure change within container 26 to cause motion of aneroid 25 whereupon rotor winding 34 is displaced from its null position to develop a signal that is communicated to servo amplifier 15 to energize motor 19 and actuate elevator 11.

The foregoing arrangement is suitable under all conditions of normal flight operations. However, it has occurred in the past that when the aircraft was changed from automatic pilot control to manual controls and then back to the automatic pilot control, the pilot of the aircraft would forget at times to disconnect the barometric altitude controller from the pilot system in returning the craft to automatic pilot control from manual control. In such a case, the barometric altitude controller, being still connected in the automatic pilot system, would impress a signal to the elevator 11 corresponding to the altitude at which it was previously operating. As a result, the aircraft would move sharply upwardly or downwardly according to the signal communicated to the elevator 11 by rotor winding 34. To prevent such a condition from occurring, the switch 39 comprising part of the instant invention has been included in the automatic pilot system.

Switch 39, diagrammatically illustrated in Figure 1, comprises a hand-operated metallic plunger 40 having a conductive plate 41 fastened thereto. Plate 41 makes electrical contact with three fixed contacts 42, 43 and 44, contact 42 being connected by way of a lead 45 to one side of a holding coil 47 circumferentially surrounding the plunger 40. The other side of coil 47 goes to ground. On closing switch 39, assuming switches 52 and 53 to be closed, contact 43 completes a circuit which energizes coils 32 from plate 41, lead 48, contact 49 of a normally closed relay 50, bypasses open glide path control switch 60 to lead 51, servo clutch control switch 52, master automatic pilot power supply switch 53, to battery 54, thence to ground, lead 55, coils 32 and lead 56. Plunger 40 is normally urged to the left as viewed in Figure 1 by a helical coil spring 57.

Upon movement of the plunger 40 to the right (looking at Figure 1), and switches 52 and 53 closed, coil 47 is energized through the following circuit, contact 42 from one side of coil 47, contact 44, lead 48, through contact 49 of normally closed relay 50, bypassing open switch 60 to lead 58, coil 59 of solenoid actuated clutch 20, grounded side of battery 54 and to the other side of holding coil 47. It is apparent from the foregoing circuit, that holding coil 47 is energized by battery 54 when plunger 40 is moved to the right and switches 52 and 53 are closed; plunger 40 being held or retained in that position by energization of coil 47 against the action of spring 57. The opening of any of switches 52, 53 and 39 will operate to de-energize coil 47 thereby disconnecting the altitude controller from the system. It is to be noted that glide path control switch 60 is normally open when the altitude controller is engaged in the pilot system and upon closing thereof, relay 50 is energized whereby contact 49 is attracted to the relay core to de-energize holding coil 47 to disconnect the altitude controller 23 from the pilot system.

Thus, under craft operating conditions previously mentioned, when the pilot disengages the automatic pilot system by opening switch 53 to operate the manual controls, the coil 47 will be immediately de-energized thereby allowing return of the plunger 40 to its non-operative position whereby the altitude controller 23 will be disconnected from the system. Therefore, upon return to automatic pilot control, the elevator 11 will not be influenced by a signal from altitude controller 23 until the pilot manually operates plunger 40 of switch 39 to engage the controller in the automatic pilot system. By the time that the pilot connects altitude controller 23 into the automatic pilot system the aneroid 25 will have expanded or contracted corresponding to the altitude at which the plane is operating, whereby the rotor coil 34 will not transmit a signal to operate elevator 11. In this manner, an adequate safety device is provided.

The instant invention also operates to insure optimum performance of the aircraft when the aircraft is placed on glide path control. Under this condition, the aircraft is placed under control of the automatic pilot system and the altitude controller 23 must be disengaged. To this end, upon closing of glide path switch 60 by the pilot to condition the aircraft for glide path control, the closed circuit through coil 47 is broken, whereby the latter becomes de-energized and plunger 40 is shifted to the left to disconnect the altitude controller 23 from the system.

It is also obvious that opening of servo control switch 52 will operate to break the circuit through coil 47.

The novel altitude controller switch 39 is more completely shown in Figures 2 and 3 as having a cylindrical casing or housing 61 which encloses a portion of plunger 40 constructed of suitable material. Located in the housing 61 and circumferentially surrounding the plunger 40 is the flux producing holding coil 47 encased in a casing 61a (Fig. 1) having a pair of leads, one of which is connected to the contact 42 and the other to ground. Formed integrally with the housing 61 is a second cylindrical housing 62 of smaller diameter than housing 61. A rectangular-shaped slot 63 is cut out in the lower side of housing 62 to accommodate a pivotally mounted lever 64 which pivots about a pin 65 disposed in slot 63. The upper portion of lever 64 is bifurcated to admit a pin 66 located on plunger 40 whereby movement of the latter will rock lever 64 about pin 65. A collar 67 is secured to the housing 62 and is provided with an opening to allow movement of plunger 40 therethrough. A knob 68 is threadedly secured to one end of the plunger to facilitate manual operation thereof. The lower end of lever 64 is flat-shaped and fits into an opening 69 in a substantially arcuate shaped member or guard 70 having a slot 71 which extends along a greater portion of the guard. One end of guard 70 is welded or secured in any suitable manner to a piston-like rod 72 slidable in an enclosure 73 formed in the lower portion of housing 61. A second rod 74 integrally formed and coaxial with rod 72 is threaded at one end to receive a nut 75 for retaining the helical spring 57 in a second enclosure 76.

The switch assembly 39 may be mounted on a circular shaped "controller unit" of the type fully described and claimed in copending application Serial No. 665,918, filed April 29, 1946, and shown in broken lines in Figures 2 and 3, by a pair of links 77a and a strap 77 which is fastened at each end to the housing 61 and wrapped about part of the controller unit. Switch assembly 39 is positioned directly over the pitch trim controller wheel 17 in such a manner that slot 71 in guard 70 is directly in line with the wheel.

Normally, when the plunger 40 is in a non-operative or "off" position guard 70 is so located with respect to trim wheel 17 that the latter protrudes through slot 71 to provide access thereto. However, upon pushing knob 68 and plunger 40 inwardly to an operative or "on" position shown in broken lines (Fig. 2) guard 70 swings outwardly against the tension of spring 57 to cover up wheel 17 whereby operation of the wheel is prevented. In order to return the guard 70 to a normal or non-operative position, the knob 68 may be pulled outwardly, or, a slight pressure applied to the guard will snap the guard to the mentioned position. Furthermore, as was previously explained, de-energization of holding coil 47 will allow the guard 70 and plunger 40 under influence of spring 57 to be returned to an inoperative position. Thus, it is apparent that there are three ways by which the guard 70 may be rendered inoperative.

The aforementioned features of the novel switch assembly 39 are particularly useful in providing for safe and efficient operation of the automatic pilot system by the pilot of the craft in preventing actuation of the pitch trim controller wheel while the barometric altitude controller is engaged in the automatic pilot system. When control of the aircraft is changed from manual operation to the automatic pilot system, the pilot in order to engage the altitude controller 23 must push knob 68 inwardly. In doing so, guard 70 swings out over the pitch trim controller wheel 17 to prevent accidental actuation of the wheel while the altitude controller 23 is so engaged. If the pilot wishes to disengage the controller 23 in order to actuate pitch trim wheel 17 to bring the aircraft to a different altitude, it is necessary only to pull out knob 68 or press on guard 70. In this manner, the pilot cannot actuate pitch trim wheel 17 while the altitude controller 23 is engaged whereby erratic operation of the automatic pilot is prevented.

Since holding coil 47 is de-energized whenever any of switches 39, 52 and 53 are opened, barometric altitude controller 23 is permanently disengaged until switch 39 is manually engaged. At the same time, upon the condition occurring whereby the craft is placed on glide path control by closing switch 60, guard 70 will be swung to an inoperative position to permit access to pitch controller wheel 17.

As will now be readily apparent to those skilled in the art, a novel and desirable altitude control switch has been provided for use in an automatic steering system which includes a barometric altitude controller adapted to be connected in the system whereby safe and efficient operation of the aircraft results.

Although but one embodiment of the invention has been illustrated and described in detail, various changes and modifications in the form and relative arrangement of parts which will now appear to those skilled in the art, may be made without departing from the scope of the invention.

I claim:

1. The combination with an automatic pilot system including manually operable attitude change means and altitude control means each adapted to drive a signal generating device to control movement of the elevator surface of an aircraft, of a switch comprising a switch operating member for moving said switch to an operative position for electrically connecting said altitude control means into the automatic pilot system to automatically govern movement of the elevator surface, holding means associated with said switch operating member for maintaining the latter in an operative position, and guard means connected to the switch operating member and movable therewith for preventing operation of the manually operable attitude change means when said switch operating member is moved to the operative position.

2. The combination with an automatic pilot system including manually operable means and altitude control means each adapted to drive a signal generating device to control movement of the elevator surface of an aircraft, of a switch comprising hand-operated means for electrically connecting said altitude control means into the automatic pilot system to automatically govern movement of the elevator surface, electrical means associated with said hand-operated means for retaining the latter in an operative position, and guard means connected to the hand-operated means and operable thereby, upon the altitude control means being electrically connected in the pilot system, for preventing actuation of the manually operable means.

3. The combination with an automatic pilot system including manually operable means and altitude control means each adapted to drive a signal generating device to control movement of the elevator surface of an aircraft, of a switch comprising a hand-operated plunger, means on said plunger for electrically connecting said altitude control means into the automatic pilot system to automatically govern movement of the elevator surface when said hand-operated plunger is actuated, a holding coil associated with said hand-operated plunger and energized when the latter is actuated to maintain the plunger in an operative position, and guard means connected to said plunger and operable thereby, upon the altitude control means being electrically connected in the pilot system, for preventing operation of the manually operable means.

4. The combination with an automatic pilot system including manually operable means and altitude control means each adapted to drive a signal generating device to control movement of the elevator surface of an aircraft, of a switch comprising actuating means for operatively connecting the altitude control means into the automatic pilot system to automatically govern the movement of the elevator surface, holding means associated with said actuating means to normally retain the latter in an operative position upon actuation thereof, and a yieldably urged guard connected to the actuating means and operable thereby, upon the altitude control means being operably connected in the pilot system, for preventing operation of the manually operable means, said guard also being operable to return the actuating and holding means to a non-operative condition whereby the altitude control means is disconnected from the pilot system.

5. The combination with an automatic pilot system including a pitch trim wheel and altitude control means each adapted to drive a signal generating device to control movement of the elevator surface of an aircraft, of a switch comprising a plunger movable to an operative position, means operable by said plunger for electrically connecting the altitude control means into the automatic pilot system to automatically govern the movement of the elevator surface when said plunger is moved to the operative position, a holding coil associated with said plunger and adapted to be energized when the latter is moved to the operative position for maintaining the plunger in said position, a guard operative for covering up the pitch trim wheel when said altitude control means is connected in the pilot system, pivotal means connecting said plunger to said guard for actuating the guard upon movement of the plunger, and resilient means acting on said pivotal means and urging said guard and said plunger to non-operative positions when the guard and plunger are in operative positions.

6. The combination with an automatic pilot system including a pitch trim wheel and altitude control means each adapted to drive a signal generating device to control movement of the elevator surface of an aircraft and a circuit including an automatic pilot system power supply switch, and a pitch servo control switch, of an altitude control switch comprising actuating means adapted to be operated for connecting the altitude control means into the automatic pilot system, a holding coil connected in the circuit with said switches and adapted to be energized when said actuating means is operated for maintaining the latter in an operative condition, and a guard connected to the actuating means for preventing operation of said pitch trim wheel when said actuating means is in the operative condition, said holding coil being deenergized when either of the pilot supply and pitch switches are opened, whereby the actuating means and the guard are rendered inoperative and the altitude control means is disconnected from the pilot system.

7. The combination with a displaceable trim member of an automatic pilot controller unit, of a switch comprising a plunger adapted to be moved into an operative position, a holding coil associated with said plunger for retaining the latter in an operative position, and a guard connected to the plunger for covering up the trim member to prevent access thereto when said plunger has been moved to an operative position.

8. The combination with a trim wheel of an automatic pilot controller unit, of a switch comprising a plunger adapted to be moved to an on position and an off position, a holding coil associated with said plunger for retaining the latter in the on position when the plunger is moved to said last-named position, a guard connected to said plunger for preventing access to the trim wheel when the plunger is moved to said on position, and resilient means normally urging said plunger to an off position and said guard to a non-operative position.

9. The combination with a trim wheel of an automatic pilot controller, of a switch comprising a hand-operated plunger adapted to be moved to an on position and an off position, a holding coil associated with said plunger and adapted to retain the latter in the on position, a guard pivotally connected to said plunger for preventing access to the trim wheel when the plunger is moved to the on position, and resilient means normally urging said guard to a non-operative position, said plunger adapted to be returned to the off position and said guard adapted to be returned to a non-operative position upon a force being applied to the guard in its operative position.

10. In an aircraft automatic pilot having an altitude controller and a manual turn controller unit provided with a displaceable pitch trim member, the combination with the turn controller unit of a two position switch which when operated to one position is adapted to connect the altitude controller with the automatic pilot and when operated to its other position is adapted to disconnect the altitude controller from the automatic pilot, a switch operating member for moving the switch to one or the other of its positions, and a guard movable with the switch operating member for making the pitch trim member inaccessible to the human pilot when the switch operating member has been moved to one position and for making the pitch trim member accessible to the human pilot when the switch operating member has been moved it its other position.

11. The combination with an automatic pilot system including manually operable means and altitude control means each adapted to drive a signal generating device to control movement of the elevator surface of an aircraft through a solenoid actuated clutch comprising a solenoid winding connected for energization by a closed clutch switch to a source of energy, of an altitude control switch comprising a switch operated member movable to an operative position for electrically connecting the altitude control means into the automatic pilot system to automatically govern the movement of the elevator surface, a holding coil connected in circuit with said source when said member is moved to the operative position and operative for maintaining the member in said position, and guard means operative for preventing operation of said manually operable means when said member is in the operative position, said guard means and holding coil being rendered inoperative when the clutch switch is opened whereby said member is returned to an inoperative position and said altitude control means is disconnected from the pilot system.

12. In combination, a control object, a switch arranged adjacent to said control object and comprising a plunger movable to two positions, a plurality of contacts adapted to be connected to a source of energy when said plunger is moved to one position, a holding coil connected to said contacts and energized upon connection of said contacts to said source for retaining said plunger in said one position, and a member connected to said plunger for preventing access to said control object when said plunger is moved to said one position and providing access to said control object when said plunger is moved to the second position.

References Cited in the file of this patent

UNITED STATES PATENTS

| Number | Name | Date |
| --- | --- | --- |
| 1,700,890 | Hodgkins et al. | Feb. 5, 1929 |
| 2,165,555 | Kronmiller et al. | July 11, 1939 |
| 2,298,068 | Pierce | Oct. 6, 1942 |
| 2,410,468 | Van Auken et al. | Nov. 5, 1946 |
| 2,415,429 | Kellogg, 2d., et al. | Feb. 11, 1947 |
| 2,429,642 | Newton | Oct. 28, 1947 |
| 2,466,702 | Hamby | Apr. 12, 1949 |
| 2,474,618 | Divoli | June 28, 1949 |